(No Model.)

F. J. AUBEUF.
RAKE.

No. 598,690.    Patented Feb. 8, 1898.

WITNESSES:
J. J. Laass
M. A. Leyden

INVENTOR
Frank J. Aubeuf
By E. Laass
his ATTORNEY

UNITED STATES PATENT OFFICE.

FRANK J. AUBEUF, OF ONEIDA, NEW YORK.

RAKE.

SPECIFICATION forming part of Letters Patent No. 598,690, dated February 8, 1898.

Application filed April 17, 1897. Serial No. 632,585. (No model.)

*To all whom it may concern:*

Be it known that I, FRANK J. AUBEUF, of Oneida, in the county of Madison, in the State of New York, have invented new and useful Improvements in Rakes, of which the following, taken in connection with the accompanying drawings, is a full, clear, and exact description.

This invention relates to hand-rakes designed more particularly for operating on lawns.

The objects of the invention are to impart superior efficiency, stability, and durability to the rake and to the auxiliary devices connected thereto; and to that end the invention consists in the improved construction and combination of parts, as hereinafter described, and set forth in the claims.

Figure 1:
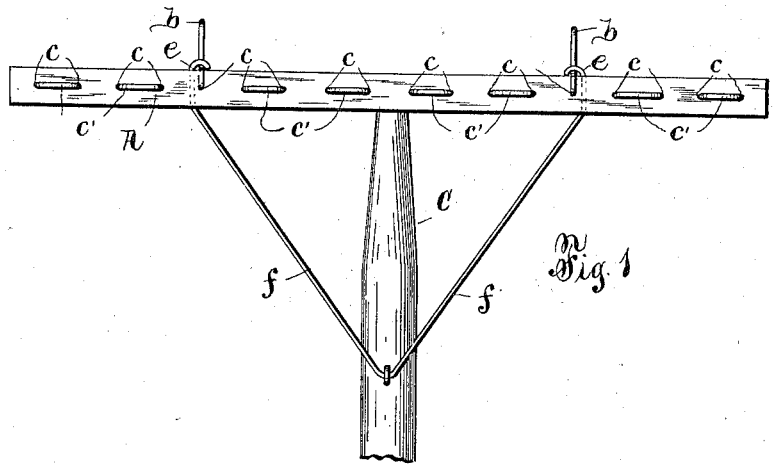
Figure 2:
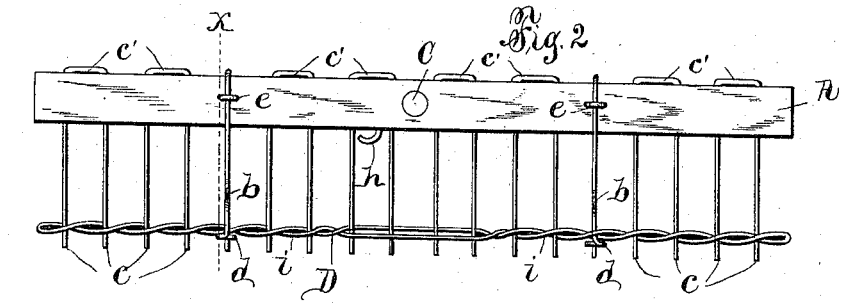
Figures 3, 4:
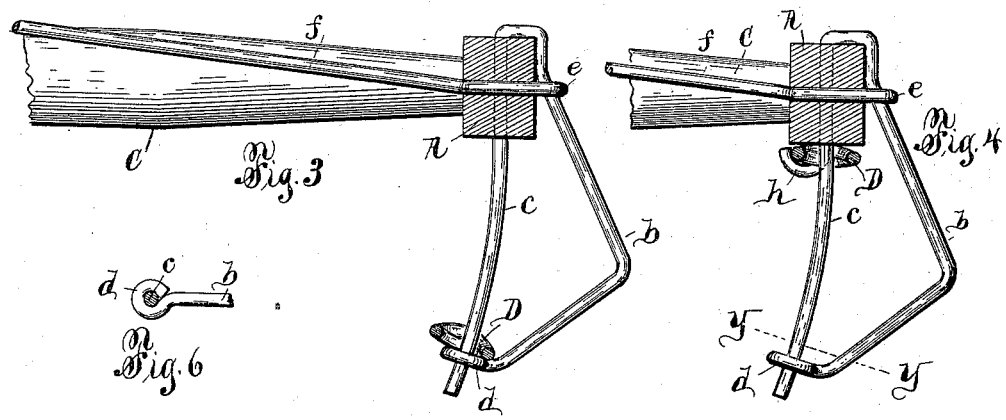
Figure 6:
Figure 5:
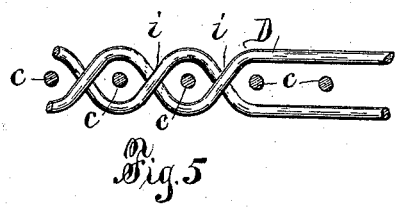

Referring to the annexed drawings, Figure 1 is a plan view of a hand-rake embodying my improvements. Fig. 2 is a front view of the same. Fig. 3 is an enlarged vertical transverse section on line X X in Fig. 2. Fig. 4 is an enlarged vertical transverse sectional view showing the means for supporting the cleaning-bar in its elevated position. Fig. 5 is an enlarged plan view of a portion of the cleaning-bar, and Fig. 6 is a transverse section on line Y Y in Fig. 4.

Similar letters of reference indicate corresponding parts.

A represents the rake-head, which is preferably formed of wood.

C denotes the handle of the rake, which handle is rigidly attached to the rake-head, and $c\ c\ c$ the teeth, which latter are formed in pairs of wire bent at right angles at its center, as shown at $c'$, so as to dispose the two teeth portions parallel. Said teeth pass vertically through the head and are confined therein by frictional contact with the wood and by the portions $c'\ c'$ bearing on top of the head.

$b\ b$ represent the guards, which project from the front of the rake and are employed to allow the teeth to be raised from the ground, so as to prevent tearing up the grass and injuring the lawn, which raising of the teeth is effected by elevating the rear end of the handle sufficient to cause the said guards to bear on the ground. Each of these guards I form in one piece with one of the teeth $c$ and of a continuous piece of wire. The tooth portion of this wire passes through the head, as aforesaid, and at the upper end of said portion the wire is bent forward and downward onto the top and front of the head, and thence forward and downward to form the guard $b$ and is terminated with an eye $d$, formed by a bend of the end portion of the wire around the lower end of the companion tooth portion, as more clearly shown in Figs. 3, 4, and 6 of the drawings.

To confine the guard $b$ in its proper forwardly-projecting position, I attach to the head A a staple $e$, which firmly embraces the aforesaid wire thereat. To simplify the construction, I prefer to form said staple in one piece with one of the braces $f$, which extend from the handle C to the head in the usual manner. Said brace passes transversely through the head at one side of the wire from which the guard is formed, and the end portion of said brace is bent into the shape of the staple $e$ to embrace the said wire, as hereinbefore described.

D represents the vertically-movable cleaning-bar, which operates by gravity and which I form of a continuous piece of wire bent so as to be intertwined, as shown at $i\ i$, between the teeth at suitable portions of the length of the row of teeth and extend along opposite sides of said row. This cleaning-bar is supported in its lowered position by means of the lower ends or eyes $d\ d$ of the guards $b\ b$ passing under said cleaning-bar, as shown more clearly in Fig. 3 of the drawings.

In order to allow the cleaning-bar to be retained in its elevated position when not required for use, I pivot to the head A a hook $h$, which is adapted to be turned into a position to engage the under side of the cleaning-bar after it has been raised to the head A, as shown in Fig. 4 of the drawings. Said hook may be formed with a screw-threaded shank, which is inserted into a socket in the under side of the head and allows the hook to be turned, as aforesaid.

What I claim as my invention is—

1. In a hand-rake, a tooth and guard formed in one piece of wire bent at one end of the tooth portion forward and thence back to the opposite end of said tooth portion and tied thereto.

2. In a hand-rake, a tooth and forwardly-projecting guard formed in one piece of wire bent at the upper end of the tooth portion forward and downward to the lower end of said tooth portion and united thereat.

3. The combination with the rake-head, of a tooth and guard formed in one piece of wire passed with the tooth portion through said head and bent over onto the top of the head and forward and downward to the lower end of the tooth portion and terminated with an eye embracing said portion, as set forth and shown.

4. The combination with the rake-head, of a tooth and guard formed in one piece of wire passed with its tooth portion through said head and bent forward and downward onto the top and front of the head and thence forward and downward to the lower end of the tooth portion and terminated with a bent portion, and a staple fastened to the front of the head and embracing the aforesaid wire, as set forth.

5. The combination with the rake-head and handle, of a tooth and guard formed in one piece of wire passed with its tooth portion through said head and bent forward and downward onto the top of the head and thence forward and downward to the lower end of the tooth portion, and the brace extending from the handle transversely through the head at one side of the aforesaid wire and having its extremity bent into the shape of a staple embracing said wire, substantially as set forth and shown.

6. The combination with a rake-head of a cleaning-bar formed of a continuous piece of wire bent into coils crossing each other between the teeth and passing alternately across the front and rear of the teeth, as set forth.

7. The combination with the rake-head rigidly attached to the handle, of guards extending from said head to the lower end portions of the adjacent teeth, a cleaning-bar supported in its lowered position on said guards, and a hook pivoted to the rake-head and supporting the cleaning-bar in its raised position, as set forth.

8. The combination with the rake and vertically-movable cleaning-bar, of guards each formed of wire and in one piece with one of the teeth the guard portion thereof projecting forward and downward from the head and tied at its lower end to the tooth portion and serving thereat to support the cleaning-bar in its lowered position, as set forth.

In testimony whereof I have hereunto signed my name this 30th day of March, 1897.

FRANK J. AUBEUF. [L. S.]

Witnesses:
  J. A. BABCOCK,
  H. L. DE PLEDGE.